United States Patent [19]

Ikedo

[11] 4,356,561

[45] Oct. 26, 1982

[54] CONTROL APPARATUS IN AUTOMATIC AUDIO DISC PLAYER

[75] Inventor: Yuji Ikedo, Tokorozawa, Japan

[73] Assignee: Pioneer Electronic Corporation, Tokyo, Japan

[21] Appl. No.: 133,138

[22] Filed: Mar. 24, 1980

[30] Foreign Application Priority Data

| Mar. 27, 1979 | [JP] | Japan | 54-36063 |
| Mar. 27, 1979 | [JP] | Japan | 54-36064 |
| Mar. 27, 1979 | [JP] | Japan | 54-36065 |
| Mar. 27, 1979 | [JP] | Japan | 54-39417[U] |

[51] Int. Cl.³ .................. G11B 17/30; G11B 21/02
[52] U.S. Cl. ............................................. 369/225
[58] Field of Search ............... 369/225, 216, 226, 231

[56] References Cited

U.S. PATENT DOCUMENTS

| 3,433,486 | 3/1969 | Kawaharazaki | 369/216 |
| 3,822,889 | 7/1974 | Nakagawa | 369/231 |
| 4,085,940 | 4/1978 | Hoshimi | 369/225 X |
| 4,201,390 | 5/1980 | Koyohata et al. | 369/226 |

Primary Examiner—Charles E. Phillips
Attorney, Agent, or Firm—Michael J. Striker

[57] ABSTRACT

A control apparatus incorporated in an automatic audio disc player which automatically performs lead-in, return, stop and repeat operations in response to start, stop and repeat indications by an operator. The control apparatus includes a size select mechanism which requires size information with respect to the size of the audio disc to be played. The size select mechanism includes an index plate rotatably mounted on the base of the player and having a plurality of stepped portions thereon, one of the stepped portions being engageable with a lead member connected to the tone arm, and positioning means connected to the index plate for positioning the index plate at a desired position.

13 Claims, 12 Drawing Figures

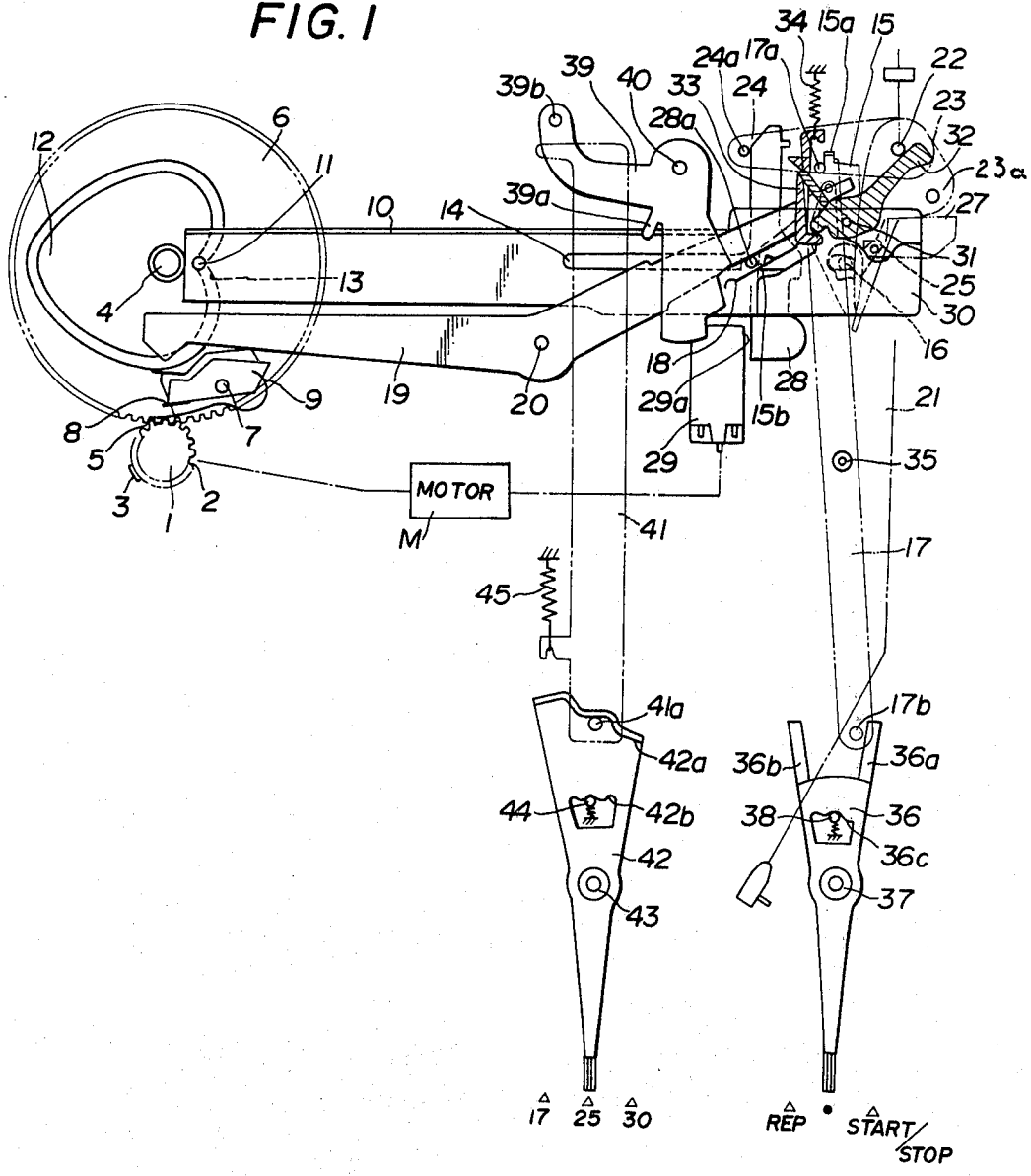

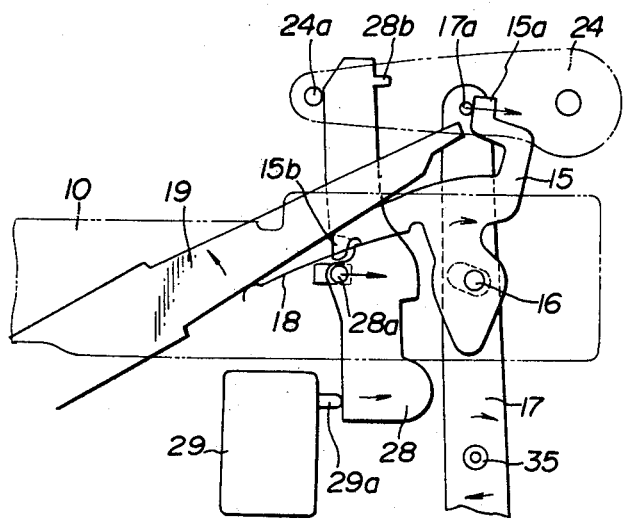
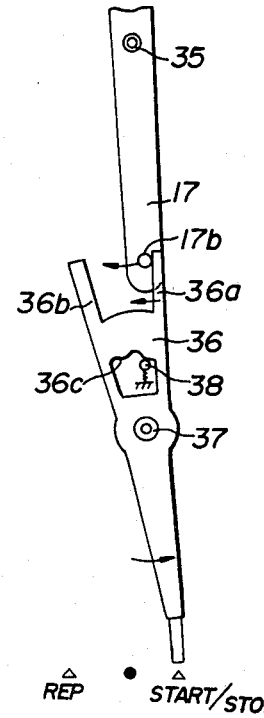
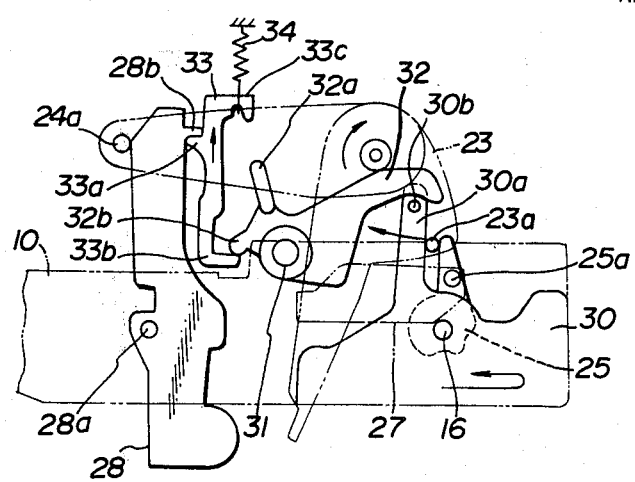

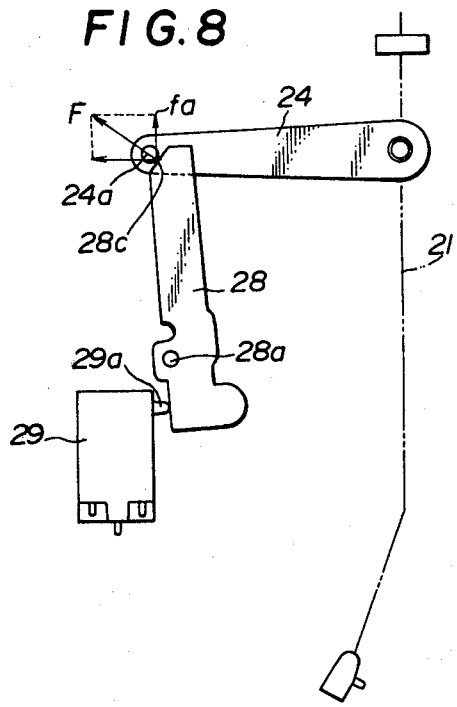
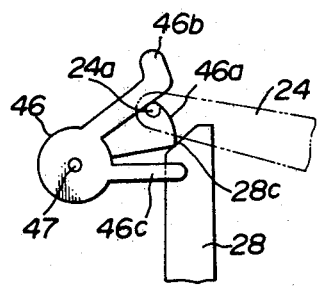
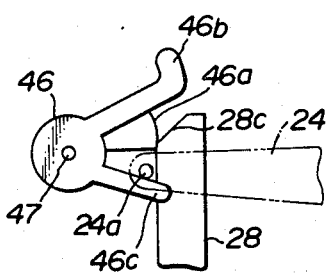

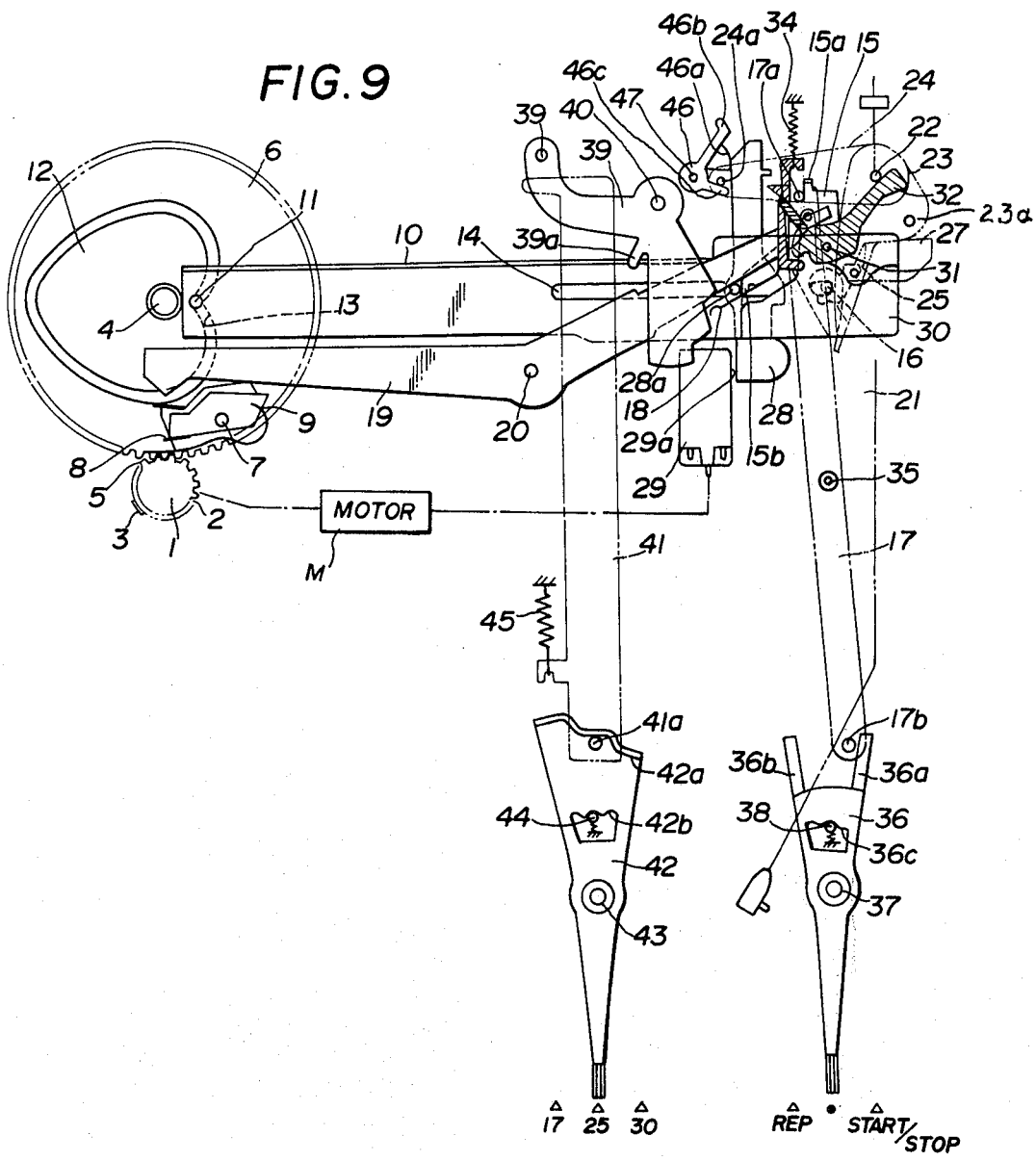

CONTROL APPARATUS IN AUTOMATIC AUDIO DISC PLAYER

FIELD OF THE INVENTION

The present invention relates to an automatic audio disc player and more particularly to a control apparatus incorporated in the automatic audio disc player.

BACKGROUND OF THE INVENTION

An automatic audio disc player is responsive to several indication signals so as to automatically perform its operation for reproducing audio information recorded on an audio disc mounted on the turn-table thereof. When, for example, a start indication signal is applied to the player, the player at first makes the turn-table to start rotation. Then, the tone arm is lifted from its rest position and led to an edge or desired position of the disc. When the tone arm reaches to the edge or desired position, the tone arm lowers onto the surface of the disc so as to play the disc until the tone arm reaches the inmost or a desired position of the disc. When the tone arm reaches the inmost or desired position, the tone arm is lifted and returned to the rest position. When, at this instant, a repeat indication has been applied to the player, the tone arm is again led on to the disc so as to repeat the reproduction.

Such automatic audio disc player as mentioned above is much useful and advantageous in playing audio discs without tedious and complicated manual operations and unwanted damages on the recording surfaces of the discs due to incorrect or erroneous operation by an operator.

However, it has been a problem in the prior art automatic audio disc players that they are much complicated in construction and accordingly are subject to troubles.

It is accordingly a primary object of the present invention to provide an improved automatic audio disc player which is relatively simple in construction.

It is another object of the present invention to provide an improved automatic audio disc player which has a simple mechanism for settling the lead-in position of the tone arm in accordance with external size information.

It is a further object of the present invention to provide an improved automatic audio disc player which can perform lead-in and return operation of the tone arm through the same handling of a single manual lever.

It is a still further object of the present invention to provide an improved automatic audio disc player which can perform a repeat operation through handling of the single manual lever in the reverse direction to the handling for lead-in and return operation.

Other objects and advantages of the present invention will become apparent to those skilled in the art from a consideration of the following detailed description of illustrative embodiments of the invention had in conjunction with the accompanying drawings in which like numerals refer to like or corresponding parts.

SUMMARY OF THE DRAWINGS

FIG. 1 is a schematic diagram showing an overall arrangement of an embodiment of the present invention;

FIGS. 2A and 2B are diagrams respectively showing in a larger scale parts of the apparatus of FIG. 1 for showing an initial step in the operation of the apparatus;

FIG. 4 is a diagram showing in a larger scale a part of the apparatus of FIG. 1 in a condition where the apparatus just started its lead-in operation;

FIG. 8 is a diagram showing relationship between some elements of the apparatus of FIG. 1;

FIG. 9 is a schematic diagram showing another embodiment of the present invention; and FIGS. 10A and 10B are diagrams respectively showing in a larger scale a part of the apparatus of FIG. 9.

DESCRIPTION OF THE PREFERRED EMBODIMENTS

Figure 3:
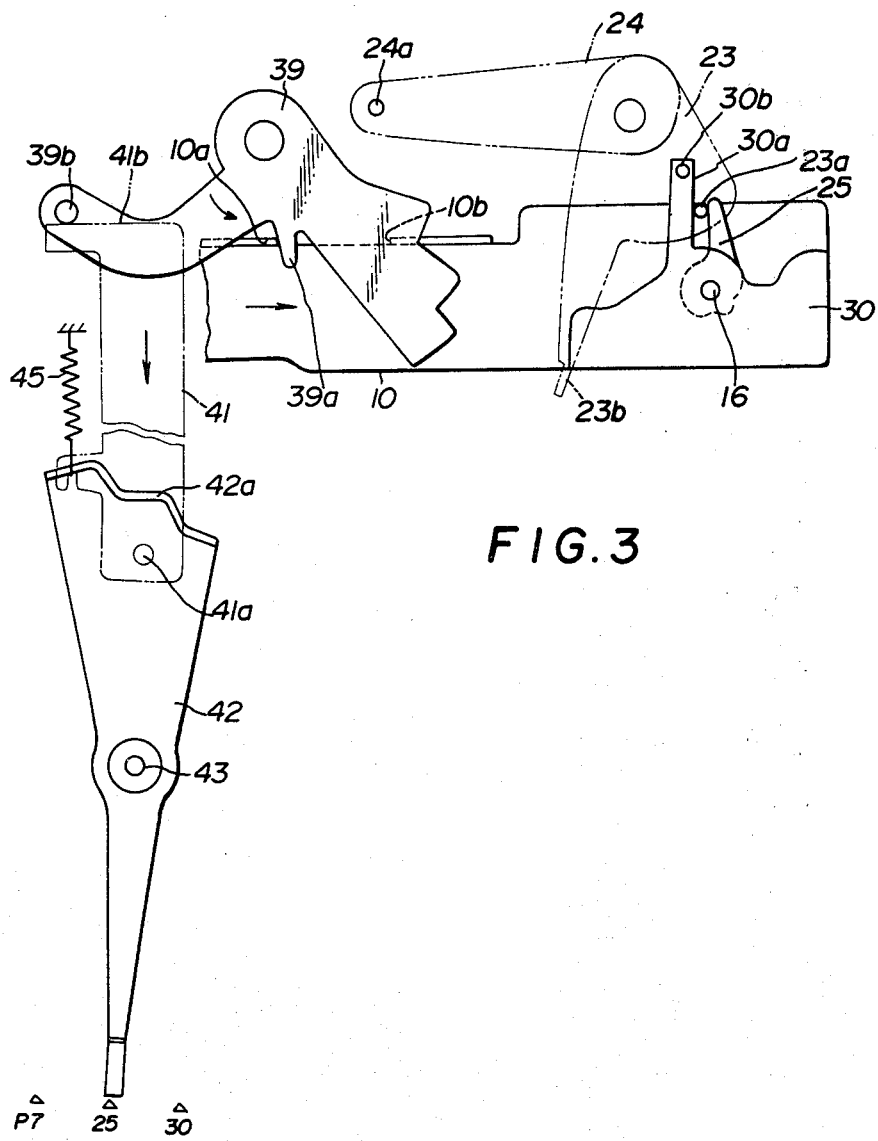
FIG. 3 is a diagram showing in a larger scale a part of the apparatus of FIG. 1 which is in a lead-in operation.

Referring to the drawings, and especially to FIGS. 1 through 7, there is shown a control apparatus or mechanism according to the present invention, which apparatus is incorporated in an automatic audio disc player. The control apparatus comprises a turn table shaft or spindle 1 which is rotatably mounted on a panel or base of the automatic audio disc player. The turn table shaft 1 supports thereon a turn table (not shown) and is driven to rotate by an electric motor M when the motor M is energized. On the periphery of the turn table shaft 1 are formed a small gear 2 and a projection 3. A cam shaft 4 is rotatably mounted on the panel and supports thereon a large gear 6 having a gain 5 at which the gear teeth are omitted. On a side surface is mounted a pivot pin 7 on which a start leaf member 9 is pivotally mounted. The start leaf member 9 has at one end thereof a trigger pawl 8 which is engageable with the projection 3 of the shaft 1. The large gear 6 has on its side surface a heart-shaped cam groove 12 with which a drive member 10 is engaged by means of a pin 11 mounted on an end portion of the drive member 10. The turn table shaft 1, the large gear 6 and the cam shaft 4 are so arranged that the small gear 2 confronts the gain 5 when the pin 11 exists at a concave portion 13 of the heart-shaped cam groove 12. The drive member 10 has a guide groove 14 extending longitudinally of the drive member 10. A guide pin (not shown) fastened onto the panel engages with the guide groove 14 and guide the drive member 10 so that the drive member 10 can slide on the panel longitudinally of the drive member 10 from a home position through an utmost position back to the home position during one turn of the gear 6. A support member 15 is loosely engaged with a pivot pin 16 mounted on the base. An end portion 15a of the support member 15 is engageable with a pin 17a formed on an end portion of a start or connect lever 17. On the other end portion of the support member 15 is mounted a plate spring 18 which abuts onto and pushes an end portion of a push lever 19 so as to push the push lever 19 when the support member 15 rotates clockwise (in the drawings) due to engagement between the end portion 15a of the support member 15 and the pin 17a. The push lever 19 is rotatably mounted by means of a pivot pin 20 on the panel. The other end of the push lever 19 abuts onto the start leaf member 9 when the one end of the push lever 19 is pushed by the plate spring 18 to rotate counterclockwise.

The tone arm is represented by a phantom line 21 and swingably mounted on a tone arm shaft 22 which rotatably mounted on the panel. On the shaft 22 are mounted a lead member 23 and hold member 24, so that the lead member 23 and the hold member 24 swing together with the tone arm 21.

A lead-in latch member 25 is rotatably mounted on the drive member 10 by means of a pin 16, which can latch the lead member 23 through a carrier pin 23a formed on one end of the lead member 23 in cooperation with a projection 30a extended from an elevation portion 30 of the drive member 10. On the latch member 25 is mounted a pin 25a which is engaged with a cam aperture 27 formed on the panel. The lead-in latch member 25 is connected with a snap action mechanism (not shown) so that it has two stable positions. In the case of FIG. 1, the lead-in latch member 25 is urged clockwise and exists at one of the stable positions and in this instance the pin 25a abuts onto the lower inner surface of the cam aperture 27.

A switch lever 28 has a pin 28a loosely engaged with the guide groove 14 of the drive member 10, for operating a mechanically-operated switch 29 fixedly mounted on the panel. The switch 29 has an armature button 29a and become conductive when the armature button 29a is released and becomes non-conductive when the armature button 29a is pushed. When the switch 29 is non-conductive, the motor M is de-energized. When the switch 29 is conductive the motor M is energized. One end portion of the switch lever 28 engages with a pin 24a formed on a free end of the hold member 24 when the tone arm 21 exists its rest position as clearly seen from FIGS. 1 and 2A. When the one end of the switch lever 28 engages with the pin 24a and the drive member 10 exists at its home position, the other end of the switch lever 28 pushes the armature button 29a as seen from FIG. 1, since the central portion of the switch lever 28 is supported by an end portion 25b of the support member 25.

The elevation portion 30 operates to raise the tone arm 21 by itself or if preferred, may cooperate with an elevation mechanism (not shown) for elevating or lifting the tone arm 21 when the drive member 10 exists near and at the utmost position. On the projection 30a of the elevation portion 30 is mounted a pin 30b which is engageable with an engagement plate 32a of a reset plate 32 rotatably mounted through a pin 31 on the panel. With one end portion 32b of the reset member 32 is engaged one end portion 33b of a connecting rod 33 which is retracted at the other end 33c by a spring 34 thereby urging the reset plate clockwise. A projection 33a formed at a medium portion of the connecting rod 33 is engaged with a projection 28a formed on the switch lever 28.

A start lever 17 is rotatably mounted by means of a pivot pin 35 on the panel, for relaying the indication signals produced by manual operation to the control mechanism. On one end of the start lever 17 is formed a pin 17a which is engaged with one end 15a of the support member 15 as clearly seen from FIG. 2. On the other end of the start lever 17 is mounted a pin 17b which is engageable with end portions 36a and 36b of a manual lever 36 which produces the indication signals in accordance with the handling by the operator. The manual lever 36 is rotatably mounted by means of a pin 37 on the panel and is selectively manually positioned at a stable neutral position, a stable repeat position and unstable or non-lock start/stop position, as clearly seen from FIG. 1. The manual lever 36 has at its central portion a cam aperture 36c to which a ball 38 biased radially outwardly from the pin 37 so that the start lever 36 is locked at the neutral and repeat positions but unlocked at the start/stop position.

An index plate 39 is rotatably mounted through a pin 40 on the panel, which has a plurality of stepped portions 39c corresponding to the respective sizes of usual audio discs. The index plate 39 has a central projection 39a which is engageable with a pair of engagement projections 10a and 10b formed on the drive member 10, as clearly seen from FIG. 5. When, therefore, the drive member 10 advances in the rightward direction in the figures, the index plate 39 rotates counterclockwise due to engagement between the engagement projection 10a and the central projection 39a. When, on the contrary, the drive member 10 advances in the leftward direction, the index plate 39 rotates clockwise due to engagement between the central projection 39c and the engagement projection 10b. On one end portion of the index plate 39 is mounted a pin 39b which is engageable with one end of a slide plate 41 slidably mounted on the panel and so biased by a spring 45 that the slide plate 41 urges the index plate 39 to rotate clockwise until a pin 41a mounted on the other end of the slide plate 41 abuts onto one of a plurality of stepped portions 42a of a size select lever 42. The size select lever 42 is rotatably mounted through a pivot pin 43 on the panel. The stepped portions 42a respectively correspond to the size of the usual audio discs, such as 30 cm, 25 cm and 17 cm. The size select lever 42 has a cam aperture at its central portion onto which a ball 44 urged by means of a spring (no reference numeral), so that the size select lever can selectively take either one of three stable positions.

The operation of the above-mentioned control apparatus according to the present invention will be explained hereinbelow.

Prior to start of playing operation, the size select lever 42 is to be handled to take one of three positions in view of the size of an audio disc mounted on the turn table and to be played. When, thereafter, the manual lever 36 handled toward the start/stop position, the start lever 17 rotates clockwise so that the support member 15 rotates clockwise as seen from FIG. 2A. It is to be noted that the manual lever 36 automatically restores to the neutral position when the manual lever 36 is released from manual operation. On the other hand, the switch lever 28 slightly rotates counterclockwise due to disengagement of the end portion 15b from the pin 28a of the switch lever 28, so that the armature button 29a is released and the switch 29 becomes counductive thereby causing the electric motor M to start and the turn table shaft 1 starts rotation.

The rotation of the support member 15 causes the plate spring 18 to push the push lever 19 so that the push lever 19 rotates counterclockwise. In this instance, the end portion of the push lever 19 abuts onto the start leaf member 9 so that the trigger pawl 8 is engaged with the projection 3, whereby the large gear 6 starts to rotate counterclockwise. When, in this instance, the gain portion 5 recedes from the small gear 2, the large gear 6 mesh with the small gear 2 so that the large gear 6 continues to rotate. When, on the other hand, the large gear 6 starts to rotate, the heart-shaped cam groove 12 starts to rotate so that the drive member 10 starts to advance from the home or leftmost position toward the utmost position, namely, rightwards. As seen from FIG. 3, the index plate 39 rotates counterclockwise since it is urged by the engagement member 10a of the drive member 10 which advances rightwardly. In this instance, the pin 39b abuts onto the end portion 41b of the slide plate 41 and further pushes the slide plate 41 in a direction as indicated by an arrow until the pin 41a of the slide plate 41 is disengaged from the stepped portion 42a of the size select lever 42, whereby the overstroke of the index plate 39 is absorbed by the movement of the slide plate 41.

In this instance, the pin 30b of the elevation cam member 30 disengages from the engagement plate 32a of the reset plate 32 due to the rightward advance of the drive member 10. However, the connecting rod 33 is locked due to the engagement between the projections 33a and 28a since the tone-arm 21 still exists at the rest position and the switch lever 28 still engages with the hold member 24 through the pin 24a, as seen from FIG. 4. The reset plate 32 accordingly keeps its non-reset position.

When, as seen from FIG. 4, the large gear 6 rotates through an angular of generally 180°, the drive member 10 advances close to the utmost or rightward position, the lead-in latch member 25 is urged to rotate counterclockwise through the pin 25a by the cam surface of the cam aperture 27. When, the drive member 10 reaches the utmost position, the lead-in latch member 25 is urged counterclockwise by the snap-action mechanism so as to latch the pin 23a of the lead member 23 in cooperation with the projection 30a of the elevation portion 30.

Figure 5:
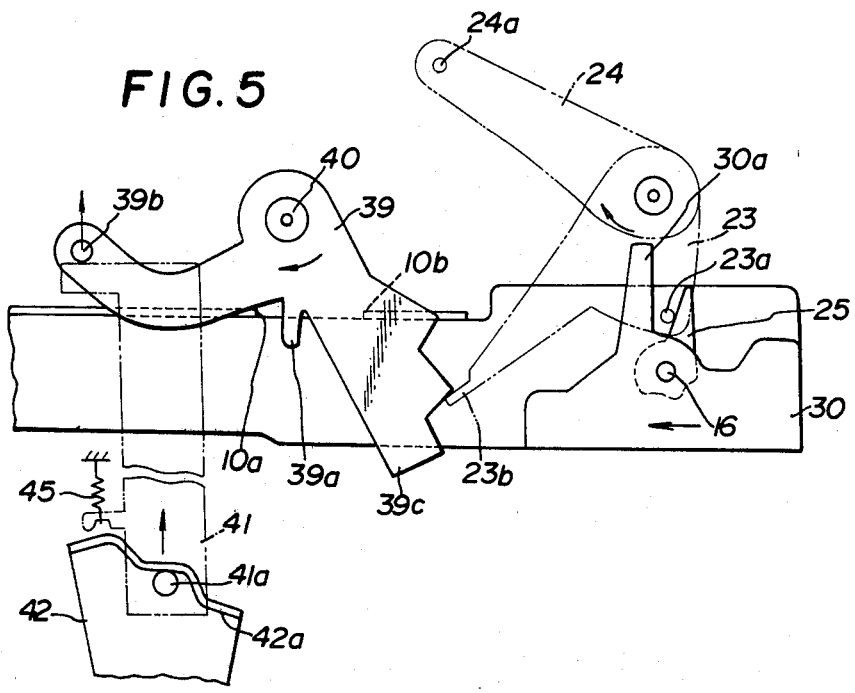
FIG. 5 is a diagram showing in a larger scale a part of the apparatus of FIG. 1 in a condition where the tone arm reaches an edge of an audio disc mounted on a turn table.
Figure 6:
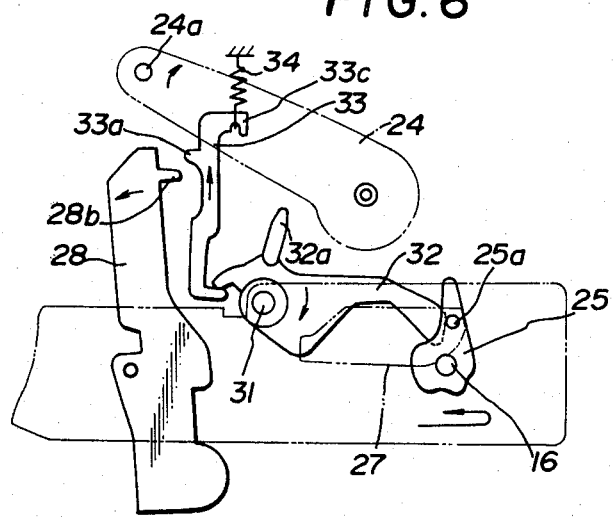
FIG. 6 is a diagram showing in a larger scale a part of the apparatus of FIG. 1 which is in a return operation.
Figure 7:
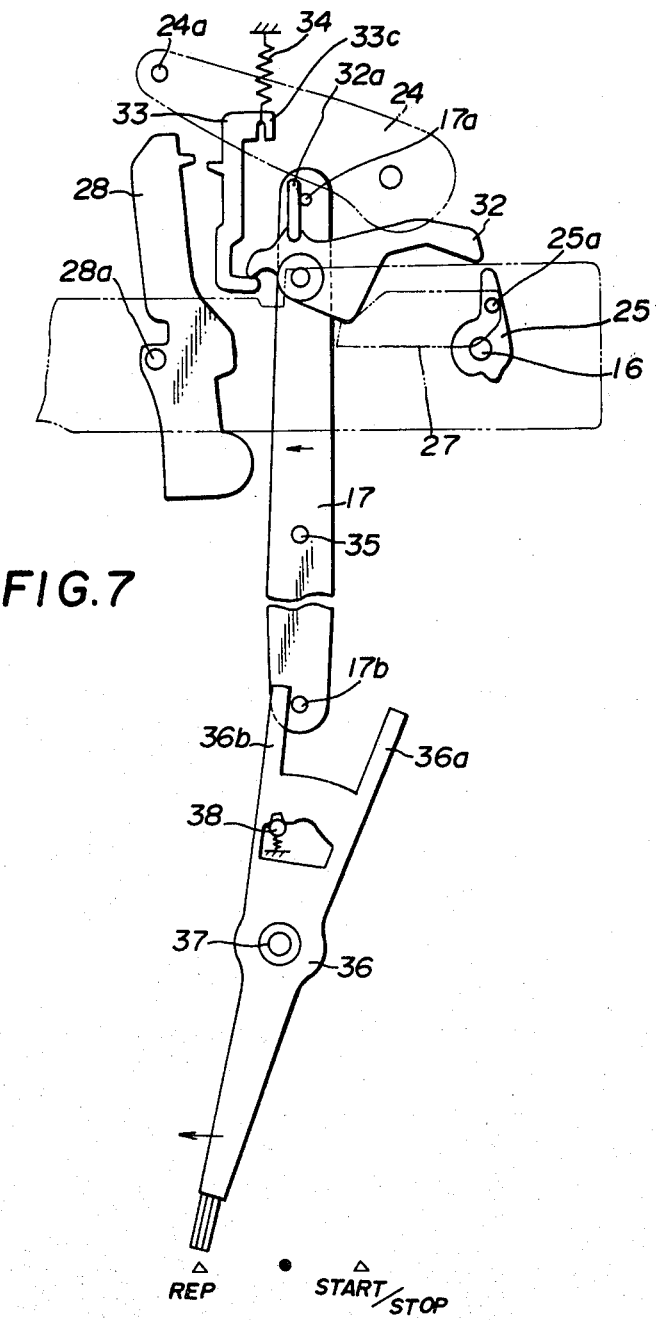
FIG. 7 is a diagram showing in a larger scale a part of the apparatus of FIG. 1 which is in a repeat operation.

When the drive member 10 starts to return toward the home position as seen from FIG. 5, the lead member 23 is urged to rotate clockwise by the lead-in latch member 25 and the projection 30a engaged together. In this instance the index plate 39 is allowed to rotate clockwise so that the slide plate 41 moves toward the drive member 10 until the pin 41a abuts onto one of the stepped portions 42a of the select lever 42. When the drive member 10 further advances leftwards until the end portion 23b of the lead member 23 abuts onto one of the stepped portion 39c of the index plate 39, the lead member 23 is prohibited its rotation so that the lead-in latch member 25 is urged to rotate clockwise and disengages from the pin 23a. When the drive member 10 further advances leftwards, the elevation cam member 30 causes the elevation mechanism to lower the tone arm onto the audio disc and, at the same time, the central projection 39a of the index plate 39 engages with the engagement projection 10a of the drive member 10 and rotates clockwise, so that the engagement between the stepped portions 39a of the index plate 39 and the end portion 23b of the lead member 23 is released thereby to allow the tone arm 21 to freely swing in accordance with advance of the stylus chip of the tone arm tracing the recording groove on the audio disc, whereby the player starts its reproduction operation.

When the tone arm 21 rotates through a predetermined angle and the stylus chip reaches to the end portion of the recording groove of the disc, the end portion 23b of the lead member 23 abuts onto the push lever 19 so that the push lever 19 rotates counterclockwise thereby to push the start leaf member 9 with the result that the large gear 6 starts to rotate due to its engagement with the gear 2. Thus, the drive member 10 starts to advance rightwards. Due to the rightward advancement of the drive member 10 the pin 30b of the elevation cam member 30 disengages from the engagement plate 32a of the reset plate 32. Since, in this instance, the tone arm 21 exists above the turn table and the pin 24a of the hold member 24 is disengaged from the end of the switch lever 28, as seen from FIG. 6, the connecting rod 33 urges the reset plate 32 clockwise whereby the reset plate 32 takes a reset position. When the drive member 10 further advances righwards, the elevation cam member 30 lifts the tone arm 21. The further rightward advancement of the drive member 10 causes the projection 30a to push the pin 23a of the lead member 23 so that the tone arm 21 rotates counterclockwise to return to the rest position. When the drive member 10 approaches the utmost position, the lead-in latch member 25 is urged to rotate counterclockwise by the cam aperture 27 and to engage with the carrier pin 23a of the lead member 23. Since, however, the reset plate 32 exists at the reset position in this instance, the reset plate 32 pushes the lead-in latch member 25 to rotate clockwise thereby to disengage from the pin 23a when the drive member 10 advances leftwards from the utmost position. Thus, the tone arm 21 stays at the rest position even when the drive member 10 advances leftwards to return to the home position. When the drive member 10 returns to the home position the player completes its tone-arm return operation.

When the player is required to perform its repeated playing or reproduction operation, the manual lever 36 is first handled to take the start/stop position and further handled to stay at the repeat position. In this condition, the control apparatus performs lead-in operation in such manner as mentioned above. When the control apparatus enters into its return operation and the drive member 10 reaches the utmost position, the reset plate 32 is kept at its non-reset position since the pin 17a of the start lever 17 abuts onto the engagement plate 32a of the reset plate 32, as clearly seen from FIG. 7, whereby the reset plate 32 permits the lead-in latch member 25 to again latch the carrier pin 23a of the lead member 23. Thus, the tone arm 21 is again led toward the turn table due to the leftward advancement of the drive member 10, so that the player again perform the lead-in operation. The control apparatus therefore performs repeatedly the lead-in operation until the manual lever 36 is returned to the neutral position.

When it is desired to stop the reproduction operation of the player, the manual lever 36 is to be handled to rotate toward the start/stop position. At this moment, the start lever 17 rotates clockwise so as to cause the support member 15 to rotate clockwise. The clockwise rotation of the support member 15 causes the plate spring 18 push the push lever 19 which then rotates counterclockwise, so that the large gear 6 engages with the small gear to drive the drive member 10. Due to the advancement of the drive member 10 results in the return operation of the control apparatus as mentioned above, whereby the player ceases playing.

It is to be noted that the control apparatus mentioned above includes an improved size select mechanism which is constituted by the index plate 39, slide plate 41 and the size select lever 42. The particular size select mechanism is much advantageous in its simple construction and reliable operation.

Since furthermore, the pivot pin 43 of the size select lever 42 exist on the slide direction of the slide plate 41, the stepped portions of the 42a can be readily formed.

Referring now to FIG. 8, there is diagramatically shown the relationship between the lead member, the switch lever 28 and the mechanically-operated switch 29 in the control apparatus explained above.

When the pin 24a of the hold member 24 engages with an inclined surface 28c of the end portion of the switch lever 28 as shown in FIG. 8, a force F is exerted on the pin 24a. In this instance, a component $f_a$ of the force F directed perpendicular to the hold member 24 urges the tone arm 21 to swing toward the turn table from the rest position. Under a light stylus pressure the tone arm 21 is therefore subject to unwanted rotation due to the component $f_a$ which causes damages of the stylus chip or the surface of the audio disc on the turn table.

In order to solve the above-mentioned problem, another control apparatus is proposed according to the present invention. This control apparatus is shown in FIGS. 9 through 10B and has identically the same construction as the control apparatus shown in FIGS. 1 through 7 except that a rotating cam member 46 is provided which is rotatably mounted on the panel by means of a pivot pin 47 in the vicinity of the switch lever 28 and the end portion of the hold member 24. The rotating cam member 46 has a pair of leg portions 46b and 46c and a cam portion 46a formed between the leg portions 46b and 46c. The cam portion 46a is engageable with the end portion of the switch lever 28 and pushes the switch lever 28 to rotate clockwise when it engages with the end portion of the switch lever 28. The leg portion 46b and 46c are engageable with the pin 24a of the hold member 24. Thus, the rotating cam member 46 is loosely engaged with the hold member 24 by means of the leg portions 46b and 46c and the pin 24. When the tone arm 21 exists at the rest position, the pin 24a of the hold member 24 urges the leg portion 46c to keep the cam portion 46a to engage with the switch lever 28, as seen from FIG. 10B. When the tone arm 21 recedes from the rest position and the stylus chip approaches the edge of the turn table, the pin 24a of the hold member 24 pushes the leg portion 46b so as to make the cam portion 46a to disengage from the end portion of the switch lever 28, as seen from FIG. 10A.

Being apparent from the above description, the control apparatus shown in FIGS. 9 through 10B operates in substantially the same manner as the control apparatus shown in FIGS. 1 through 7 but the former is free from such unwanted rotation of the tone arm 21 as mentioned above.

Furthermore, the arrangement including the rotating cam member 46 permits a larger allowance in positioning the shaft 22 of the tone arm 21 thereby making easy to assemble the overall player including the control apparatus.

It will be understood that the invention is not limited to the exact constructions shown and described and that various changes and modifications may be made without departing from the spirit and scope of the invention, as defined in the appended claims.

What is claimed is:

1. A control apparatus incorporated in an automatic audio disc player which includes a base, a turn table rotatably mounted on said base and a tone arm swingably mounted on said base for picking up audio signals recorded on a recording medium disposed on said turn table, the apparatus comprising a drive member so mounted on said base as to linearly move between a home position and an utmost position with respect to said base; control means connected to said drive member, for urging said drive member to move from said home position up to said utmost position and to return to said home position when it is triggered; trigger means connected to said control means, for triggering said control means when operated; a lead member fixedly connected to said tone arm and being swingable together with said tone arm; latch means mounted on said drive member, for latching said lead member on to said drive member when said drive member takes said utmost position; limit means mounted on said base and being engageable with said lead member, for limiting the extent of rotation of said lead member when said slide member exists at and near said utmost position; and cam means associated with said drive member, for raising said tone arm when said drive member exists at and near said utmost position, said control means including a switch lever loosely engaged at the central portion thereof with said drive member, a mechanically-operated switch fixedly mounted on said base and having the armature button thereof engaged with one end of said switch lever, said switch being non-conductive when said the armature button is urged, hold means connected with said tone arm, for holding the other end of said switch lever, support means connected to said trigger means, for supporting said central portion of said switch lever until it is triggered, so that said switch lever urges said the armature button of said switch, a prime mover connected to said switch to start rotation when said switch becomes conductive, and a cam arrangement connected to said drive member, for pushing said drive member from said home position to said utmost position and subsequently for retracting said drive member from said utmost position to said home position, when it is triggered.

2. A control apparatus incorporated in an automatic audio disc player which includes a base, a turn table rotatably mounted on said base, and a tone arm mounted on said base swingably between a rest position and a play zone for picking up audio signals recorded on a recording medium disposed on said turn table, the apparatus comprising a drive member so mounted on said base as to linearly move between a home position and an utmost position with respect to said base; control means connected to said drive member, for urging said drive member to move from said home position up to said utmost position and to return said home position at each time when it is triggered; trigger means connected to said control means, for triggering said control means when operated; a lead member fixedly connected to said tone arm and being swingable together with said tone arm; latch means mounted on said drive member, for latching said lead member on to said drive member when said drive member approaches said utmost position; reset means mounted on said base and being engageable with said latch means, for prohibiting said latch means to latch said lead member when said tone arm is apart from the rest position; limit means mounted on said base and being engageable with said lead member, for limiting the extent of rotation of said lead member; and cam means associated with said drive member, for raising said tone arm when said member exists at and near said utmost position, said control means including a switch lever loosely engaged at the control portion thereof with said drive member, a mechanically-operated switch fixedly mounted on said base and having the armature button thereof engaged with one end of said switch lever, said switch being non-conductive when said the armature button is urged, hold means connected with said tone arm, for holding the other end of said switch lever, support means connected to said trigger means, for supporting said the central portion of said switch lever until it is triggered, so that said switch lever urges said the armature button of said switch, a prime mover connected to said switch to start rotation when said switch becomes conductive, and a cam arrangement connected to said drive member, for pushing said drive member from said home position to said utmost position and subsequently for retracting said drive member from said utmost position to said home position, when it is triggered.

3. A control apparatus according to the claim 2, in which said limit means includes:

an index plate rotatably mounted on said base and having a plurality of stepped portions to one of which said lead member is engageable, said index plate being driven by movement of said slide member; and positioning means connected to said index plate, for positioning said index plate at a selected one of a plurality of positions.

4. A control apparatus according to the claim 3, in which said positioning means includes:

a slide plate slidably mounted on said base and being slidable in a direction generally perpendicular to the slide direction of said drive member; and a size select lever swingably mounted on said base and having a plurality of stepped portions onto one of which said slide plate engages, said size select lever being operated so as to take a selected angular position.

5. A control apparatus according to the claim 4, in which said positioning means further includes a biasing means connected to said slide plate, for urging said slide plate to firmly engage with said one of the stepped portions of said select lever.

6. A control apparatus according to the claim 2, in which said hold means includes:

a hold member fixedly connected to said tone arm and being engageable at the free end thereof with said the other end of said switch lever when said tone arm exits at a rest position.

7. A control apparatus according to the claim 2, in which said hold means includes:

a hold member fixedly connected said tone arm; and a rotating cam member rotatably mounted on said base and loosely engaged with said hold member, said cam member holding said the other end of said switch lever when said tone arm exists at a rest position.

8. A control apparatus according to the claim 2, in which said trigger means includes:

a start pawl swingably mounted on said cam arrangement, for connecting said cam arrangement with said prime mover, when it is pushed;

a push lever rotatably mounted on said base, for pushing said start pawl when it is triggered; and start control means connected to said push lever and said support means, for triggering said push lever and said support means.

9. A control apparatus according to the claim 8, in which said start control means includes:

a start lever rotatably mounted on said base;

a support member movably mounted on said base which can support at one end thereof said the central portion of said switch lever when it exits at a home position ceases supporting said the central portion and triggers said push lever when it exits out of said home position; and a manually operated lever connected to said start lever, for urging said start lever so that said support member deviates from said home position.

10. A control apparatus according to the claim 9, in which said latch means includes:

a projection protruded from said drive member;

a latch member so mounted on said drive member as to have two stable positions and to transfer from one position to the other thereby to latch said lead member in cooperation with said projection when said drive member reaches said utmost position.

11. A control apparatus according to the claim 1, in which said reset means includes:

a reset plate rotatably mounted on said base and having reset and non-reset positions so that it prevents said latch member from latching said lead member when it exits at said reset position; and lock means connected to said reset plate and said switch lever, for holding said reset plate at said non-reset position when said switch lever engages with said hold means and when said drive member is in the path returning from said utmost position to said home position, and for allowing said reset plate to take said reset position when said switch lever dis-engages from said hold member.

12. A control apparatus according to the claim 11, which further comprises:

reset preventive means for disabling said reset means, when it is operated.

13. A control apparatus according to the claim 12, in which said reset preventive means includes;

a pin member mounted on said start lever and being engageable with said reset plate, for preventing said reset plate from taking said reset position when said start lever is operated to take a repeat position; and repeat control means connected with said start lever, for operating said start lever to take said repeat position.

* * * * *